Jan. 31, 1956
R. S. MYERS
2,733,386
PANELBOARD MOUNTING FOR CIRCUIT BREAKERS
Filed Feb. 2, 1953
2 Sheets-Sheet 1
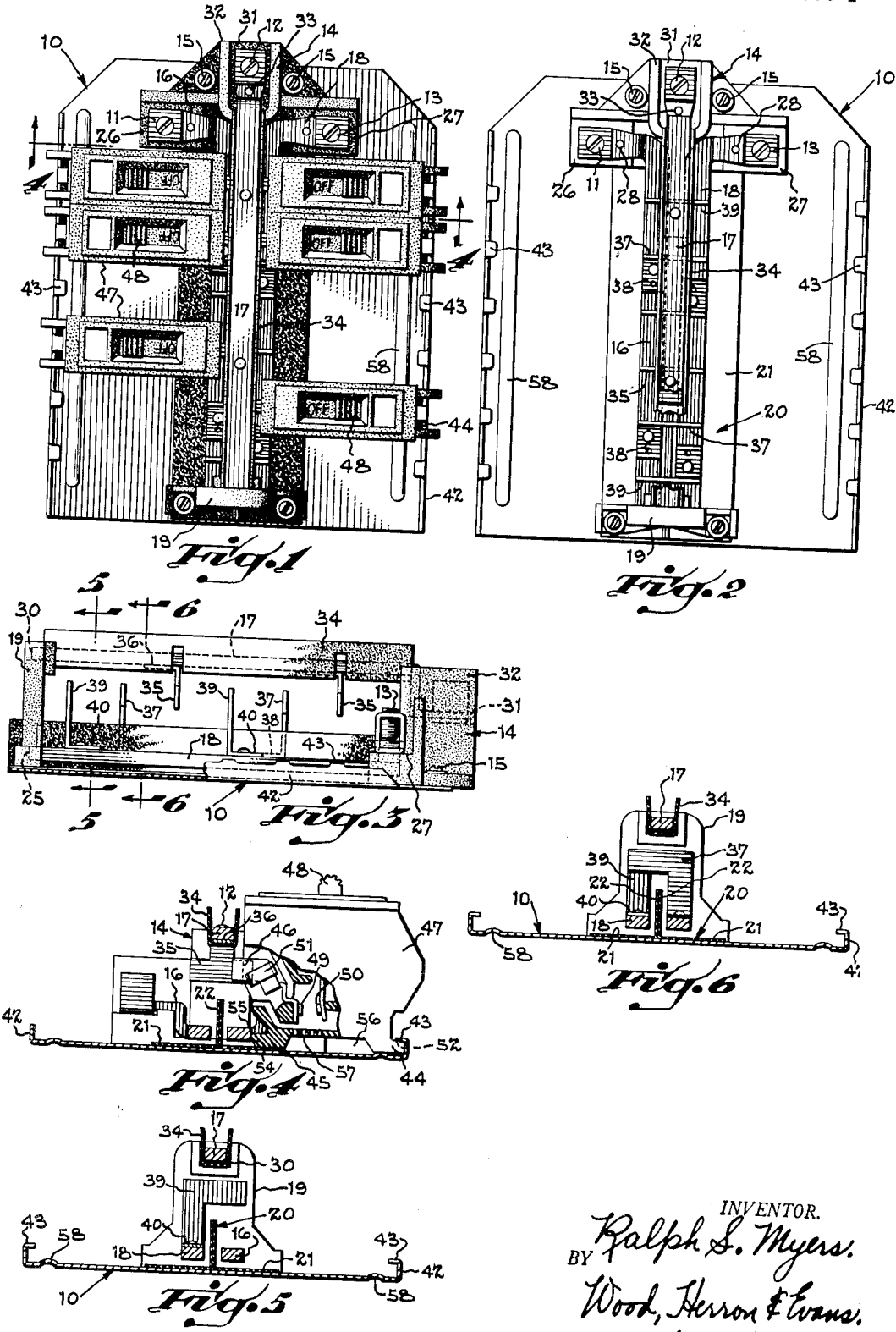
INVENTOR.
BY Ralph S. Myers.
Wood, Herron & Evans,
ATTORNEYS.

Jan. 31, 1956

R. S. MYERS 2,733,386

PANELBOARD MOUNTING FOR CIRCUIT BREAKERS

Filed Feb. 2, 1953

INVENTOR.
BY Ralph S. Myers.
Wood, Herron & Evans.
ATTORNEYS.

United States Patent Office 2,733,386
Patented Jan. 31, 1956

2,733,386

PANELBOARD MOUNTING FOR CIRCUIT BREAKERS

Ralph S. Myers, Covington, Ky., assignor to The Wadsworth Electric Mfg. Company, Covington, Ky., a corporation of Kentucky Application February 2, 1953, Serial No. 334,547

12 Claims. (Cl. 317—119)

This invention relates to protective devices for electrical circuits, and is directed in particular to the combination of a resettable circuit breaker construction and a panelboard mounting for receiving a plurality of circuit breakers and furnishing electric circuit connections to them.

The panelboard mounting and circuit breaker construction of the present invention are for domestic use primarily; but they also may be used in light industrial wiring systems where the electrical loads are comparable to those of domestic systems. Electric panelboards are located in a building where the main feeder lines branch into the electrical circuits which supply the various electrical requirements throughout the building. Bus bars on the panelboard are connected with the main electric feeder lines, and the circuit breakers connected between the bus bars and branch lines to furnish overcurrent protection therefor. The resettable type of circuit breaker employs current responsive means, effective upon the occurrence of an overload, for tripping toggle mechanism which breaks or opens the circuit. The breaker mechanism is enclosed in an insulated housing, and has a handle at the outer face thereof by means of which the breaker may be reset after being tripped. Usually, an assemblage of such circuit breakers is mounted upon a single panelboard, the number and disposition of the breakers in the assemblage being dependent upon the number of circuits to be served.

Heretofore, two general types of fastening means have been utilized for securing circuit breakers to a panelboard. In one, the breakers are rigidly bolted or otherwise secured directly to a base member, and auxiliary strap connectors or "jumpers" are used for interconnecting the terminals of the breakers with the bus bars. Installing a panelboard having this type of fastening means is tedious and time consuming; but, the means has the advantage that good, broad surface to surface contact is provided at the junctures of the respective electrical current carrying members. In the second type, commonly referred to as the "plug-in" type, provision is made on the panelboard for receiving prongs or stabs, which serve the double function of securing the circuit breaker to the panelboard and establishing the electrical connection. In this type of mounting, assembly is greatly simplified, but there is the disadvantage that less than satisfactory, and oftentimes dangerous, electrical connection is established.

It is one of the objectives of the present invention to provide an economical mounting means for circuit breakers, incorporating a novel frictional interlock, which has the advantages of both types of fastening means without the noted disadvantages. The present invention also concerns the construction of the panelboard mounting itself, and particularly the arrangement of the bus bars and circuit connection elements which are provided.

In the preferred embodiment of the invention, the circuit breaker is adapted to be received by the panelboard in plug-in fashion. The breaker is simply rocked into place and proper electrical connection established. Thus, assembly may be made rapidly. However, once in place, the weight of the circuit breaker and the forces necessary to maintain safe, tight electrical connection are borne by base members and are not concentrated at mating surfaces of electrical current carrying members.

The frictional interlock provided is one in which the circuit breaker housing is wedged or buttressed between a bus bar, which is rigidly affixed to the panelboard mounting, and a flange, which preferably is formed as part of the panelboard mounting. In this relationship, the holding forces are borne by the circuit breaker housing and the panelboard mounting, thus relieving the mating contact surfaces of stresses which might otherwise exist and result in a spotty, high resistance connection.

The contacts provided are the knife or blade type, preferably consisting of a stab and a pair of flat jaws which are arranged to receive the stab. The stab contact preferably is mounted upon a bus bar and the flat jaws contact carried by the circuit breaker, although this relationship may be reversed if desired. The important consideration is that the respective contacts be so related and disposed that they engage while the circuit breaker is being rocked into place. During such engagement, the contacts slide upon one another and with the circuit breaker free, can adjust themselves to each other. Otherwise expressed, the contacts serve as guides for correctly positioning the circuit breaker while it is being rocked toward final position, and thereby insure that good electrical contact be made initially, before locking takes place. Final locking occurs only after a good, broad contact relationship is established. Once established, the interlock is maintained as long as the breaker is on the panelboard.

Other objectives, features and advantages of the invention will be readily apparent from the following detailed description of the drawings in which:

Figure 1 is a front elevational view of a panelboard mounting construction, adapted for three phase circuit operation, showing circuit breakers in place.

Figure 2 is a view similar to Figure 1 showing the panelboard construction with the circuit breakers removed.

Figure 3 is a side elevational view of the panelboard mounting.

Figure 4 is a cross sectional view taken on the line 4—4 in Figure 1.

Figure 5 is a cross sectional view taken on the line 5—5 in Figure 3.

Figure 6 is a cross sectional view taken on the line 6—6 in Figure 3.

Figure 7:
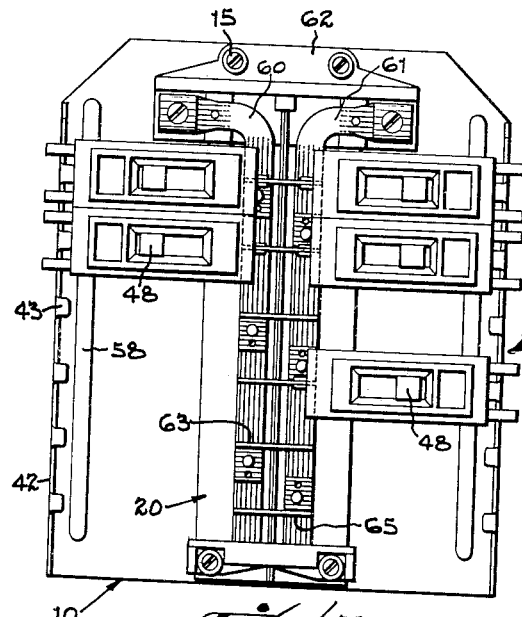
Figure 7 is a front elevational view of a panel-board construction, with circuit breakers in place, which is adapted for single phase circuit operation.

The elements of the invention are mounted upon a back plate 10. This plate may be secured by bolts or other known means in an appropriate enclosure such as a metal box which is sufficiently wide to provide adequate wiring gutters at the two sides of the back plate. In general, connections are made with the main feed lines at the top center of the panelboard and the branch lines taken off at the respective sides. Specifically, in the three phase mounting of Figure 1, three feed line screw connectors 11, 12 and 13 are mounted upon an end block 14 which is made of dielectric material and which is secured to the back plate 10 by bolts 15—15. The electrical connectors 11, 12 and 13 are secured respectively to three bus bars 16, 17 and 18. These bus bars extend from block 14 down the mid-portion of back plate 10 and are supported at their lower ends by a second insulator block 19. Bus bars 16 and 18 are disposed at the opposite sides of the vertical center line of back plate 10 and are spaced from one another and the back plate.

In addition, the two bus bars 16 and 18 are insulated one from the other and from back panel 10 by a pair of right angular, fiber strips 20 which extend from insulator block 14 at the upper end of the back plate to the insulator block 19 at the lower end of the back plate. More particularly, each insulator strip 20 includes a foot flange 21 which rests against back plate 10 and an upstanding flange 22. The respective upstanding flanges are disposed back to back, as shown in Figure 6, and reside between bus bars 16 and 18. Both insulator blocks 14 and 19 are slotted to accommodate the ends of the respective upstanding flanges 22.

The lower ends of bus bars 16 and 18 are seated within sockets 25 formed in the upper face of insulator block 19. The upper ends of these two bus bars are turned outwardly with respect to one another toward the feed line screw connectors 11 and 13 respectively, which are disposed upon seats 26 and 27 formed in the two sides of block 14. These seats are elevated or disposed outwardly from back plate 10 with respect to the bars. Thus, at the upper end, each bar is bent to a side, then bent upwardly, and again to the side to join the connector upon the seat. Each of bars 16 and 18 are secured at the seat by means of a bolt 28 which traverses block 14 from the rear thereof and threads into the bar adjacent the connector.

In the three phase construction of Figures 1–5, the third bus bar 17 is disposed upon the vertical center line of the mounting, but is spaced substantially outwardly from bars 16 and 18. The lower end of bar 17 also is seated within a socket 30 formed in insulator block 19. The upper end of bar 17 is fastened to feed line screw connector 12 which is seated within a well 31 formed in the outer face of a center pedestal portion 32 of block 14. The upper end of the bar is turned inwardly and then upwardly to join connector 12. The upper end of the bus bar 17 is also fastened from the inner face of block 14 by means of a bolt which is shown at 33. A channel shaped, fiber strip 34 insulates bar 17. This strip is seated at its lower end in block 19 and at its upper end in block 14 and encloses the inner face and two sides of the bar.

The panelboard mounting disclosed in Figures 1–6 is designed to accommodate 12 circuit breakers and for this purpose, each of the three bus bars is provided with four electrical connections. However, as will appear from the following description of the mounting, the number of connections can be varied, while maintaining the same connector relationships, in multiples of six; or if desired, odd number of connections may be added to meet specific installation requirements.

The bus bar 17, for example, has two T-shaped elements 35 each of which presents two blade contacts at opposite sides of the horizontal arm of the connectors. Each T-shaped connector includes a right angular foot 36 which is riveted to the inner face of bar 17. Bus bar 16 also has two connector elements 37 mounted upon it, each of which is in the shape of an L providing two blade contacts at the opposite ends of the horizontal arm of the L. Connector elements 37 are also turned over to provide foot portions 38 which are riveted, in this instance, to the outer face of the bus bar. The horizontal arm of each of the L-shaped connector elements 37 extends to the right as seen in Figure 1, overhanging bus bar 18. Each of these is identical to the L-shaped connector elements 37 on bus bar 16, but is turned in the opposite direction so as to overhang bar 16. The latter connector elements also have foot portions 40 turned over at a right angle and riveted to the bus bar.

The respective connector elements are disposed in staggered relationship and are aligned and equally spaced vertically. Starting at the top of the panelboard mounting, the two blade contacts provided by the first connector element 35 are disposed adjacent the upper end block 14. Next, are the two blade contacts provided by the upper one of elements 35, and then, retaining the same spacing, are the blade contacts of the upper one of elements 39 on bus bar 18. The grouping of six blade contacts is repeated again with the connector elements disposed in the same order, e. g., 35, 37, and 39. This arrangement of bus bars, connector elements and contact blades has the advantage that two electrical connections may be made with each of the three bus bars at each of the two sides of the mounting. Thus, in a three phase installation, where it is desirable to install a circuit breaker in each of the three lines, the three breakers for the circuit may be placed together to constitute an easily identified group. The group may be disposed at either side of the bus bars, anywhere from top to bottom, as long as the circuit breakers are placed side by side. The arrangement also has the advantage that 110 volt single phase light circuits; 220 volt single phase power circuits; 220 volt three phase power circuits; and other circuits of both 110 volt and 220 volt potentials may be set up on one board at the same time, simply by selecting proper blade contacts for the branch lines.

The back plate 10 preferably is formed of heavy sheet metal. Each of the side edges of the back plate is turned forwardly at a right angle to provide a side flange 42. Along the outer edge of each side flange, six tabs such as those indicated by the numeral 43 are provided, these tabs being turned inwardly toward the bus bars at points opposite the respective blade contacts provided by elements 35, 37 and 39. The tabs are small and rectangular in outline having their corners broken or rounded slightly. These tabs are designed to cooperate with the circuit breakers of the present invention to provide a frictional interlock for holding the breakers in position in which they are wedged between the tabs and a bus bar opposite the tabs. The interlock is discussed below in greater detail.

The circuit breakers illustrated are of conventional design, except in four important particulars, which are: the provision of a foot 44, which is designed to engage and seat a tab 43; the provision of a foot 45, which is designed to wedge against the side of a bus bar; the provision of a branch line connector in a recess immediately above foot 44; and the provision of contact jaws 46, immediately above foot 45. The rest of the circuit breaker may comprise a generally rectangular, narrow, insulated housing 47 having a reset handle 48 at the outer face thereof. Preferably, the breaker mechanism housed in casing 47 consists of a spring loaded toggle which is arranged to snap into open circuit position upon being tripped either by a bi-metal element, designed to warp under prolonged overload conditions, or a magnetically responsive element activated by a surge load condition. Of this mechanism, only the contacts are illustrated, being shown in Figure 4 in open circuit position where the stationary contact is indicated at 49 and the movable contact indicated by the numeral 50. Contact jaws 46 are connected electrically with the stationary contact. A spring metal clip, such as the one shown at 51, embracing jaws 46, may be provided for urging the two blades comprising the jaws toward one another to insure good electrical contact when the jaws are engaged over a bus bar blade contact.

Referring now to Figure 4, the frictional interlock made between a circuit breaker and the panelboard mounting is one in which the feet 44 and 45 of the circuit breaker housing are wedged respectively against a side flange 42 and a bus bar 16 or 18, depending upon which side of the panelboard the circuit breaker is disposed. Specifically, the upper face of foot 44 is recessed as indicated at 52 to receive a tab 43. The other foot is substantially wedge shaped at its outer face, the wedge shape being provided by angulating the face inwardly and downwardly as shown at 54. The upper edge at the outer end of foot 45 preferably is rounded as shown at 55. Both feet are flat on the bottom. The housing between the feet is relieved to provide an air gap 56. In the construction shown, an arc vent 57 is provided in the bottom of the circuit breaker housing and air gap 56 serves to exhaust the gases formed upon the opening of the circuit under excessive load conditions.

The installation of a circuit breaker is simply a matter of plugging it in upon the mounting panel opposite the desired blade contact. The motion used is a rocking one, in which foot 44 is first engaged under a tab 43 and the breaker then swung in to bring foot 45 into contact with the side of the bus bar beneath the selected blade contact. The outer foot 44 of the circuit breaker, therefore, is buttressed against the side flange of back plate 10, where it is locked against sidewise displacement by the seated overhanging tab, while the opposite foot of the breaker bears frictionally against the bus bar. In order to insure positive seating contact between recess 52 and the tab 43, a rounded rib 58 is formed in the plate parallel with side flange 42 in position to receive the flat bottom of foot 44. The foot, therefore, pivots on the top of rib 58 when the breaker is being plugged in. The rib, in addition, compensates for the thickness of insulation strip 21 and thereby maintains the breaker parallel with the back plate 10.

The jaws 46 engage the blade contact before foot 45 moves into position to wedge against the bus bar, thus the circuit breaker is guided into correctly aligned relationship by the contact blade before being locked in place upon the mounting by means other than the blade. The electrical connection, therefore, serves as a guide, and not as a primary holding member. Thus, the contact parts are permitted to adjust themselves to each other so that good, broad surface to surface electrical contact is established before the circuit breaker is locked in place to maintain this contact. In place, the holding forces are borne by the feet of the housing. In this relationship, the engaged bus bar serves a double function; one, of carrying the main feed line current for distribution to the various connectors, and two, of buttressing the wedge shaped foot 45.

Figure 8:
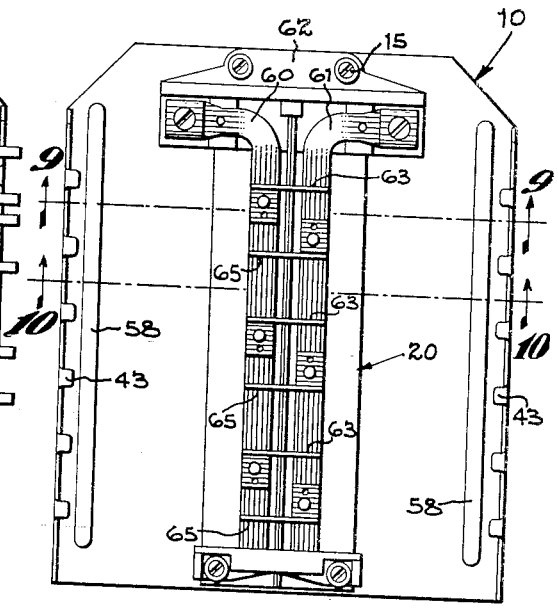
Figure 8 is a view similar to Figure 7 showing the panelboard mounting with the circuit breakers removed.
Figure 9:
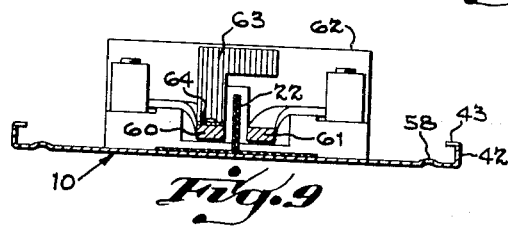
Figure 9 is a cross sectional view taken on the line 9—9 in Figure 8.
Figure 10:
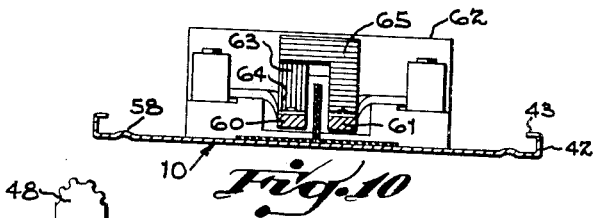
Figure 10 is a cross sectional view taken on the line 10—10 in Figure 8.
Figure 11:
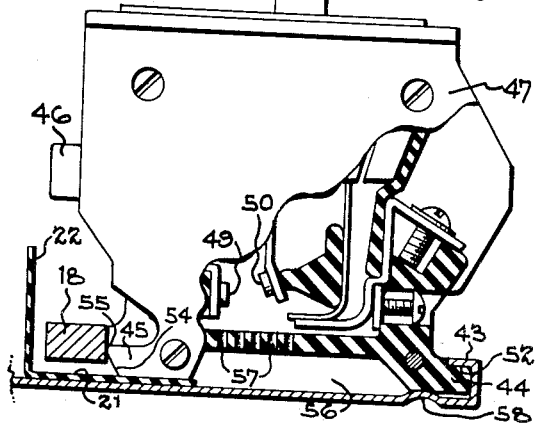
Figure 11 is an enlarged fragmentary view illustrating the frictional interlock provided for securing a circuit breaker to the mounting.

The same frictional interlock is provided in the modified form of the panelboard mounting shown in Figures 7–10. The mounting in this instance carries two bus bars and is, therefore, adapted for single phase circuit connections only. One of the bus bars is indicated at 60. The other is indicated at 61. These two bars correspond to bus bars 16 and 18 respectively of the three phase panelboard mounting discussed above. The only other substantial change is in the construction of the two insulator blocks. The upper block is indicated by the numeral 62 and differs from insulator block 14 in the omission of the central pedestal portion 32. The seats for the feed line connectors, the method of fastening the bus bars, and the bolt means employed for securing the insulator blocks to the back panel are substantially unchanged.

Twelve contact blades are also provided in the single phase panelboard mounting. These consist of L-shaped connector pieces which are similar to the connector pieces 37 and 39 described above. Specifically, bus bar 60 carries three such connectors, these being indicated by the numeral 63. Each has a right angular foot portion 64 which is riveted to the bar. The horizontal arm of each of the L-shaped connector pieces on bar 60 overhangs bar 61. The bus bar 61 also has three L-shaped connectors 65 mounted upon it in the same manner. These connectors are identical with connectors 63 except that they are faced in the opposite direction so as to overhang bar 60. The respective connectors on the bars alternate from top to bottom with the uppermost one, in the instance shown, extending to the right from bar 60 over bar 61. The contact blades provided are equally spaced and arranged so that the adjacent circuit breakers reside side by side when connected with adjacent blades. The other parts of the assembly are substantially identical with corresponding parts in the embodiment disclosed above and the same character references are applied.

Having described my invention, I claim:

1. The combination of a panelboard mounting and a circuit breaker construction adapted to be received by the panelboard mounting in plug-in fashion, said combination comprising a back plate, a bus bar extending longitudinally of said plate, a flange disposed in spaced parallel relation to said bus bar, a circuit breaker having an insulated housing including a pair of feet which are located respectively adjacent to the opposite ends of said housing, said feet being spaced to be wedged into the space between said bus bar and said flange to hold said housing in fixed position with respect to said bus bar, and contact means engageable when said circuit breaker is thus buttressed to establish electrical connection between said circuit breaker and said bus bar.

2. The combination of a panelboard mounting and a circuit breaker construction adapted to be received by the panelboard mounting in plug-in fashion, said combination comprising a back plate, a bus bar extending longitudinally of said plate, a blade contact in electrical connection with said bus bar and extending outwardly therefrom, a flange disposed in spaced parallel relation to said bus bar, a circuit breaker having an insulated housing including a pair of feet which are disposed respectively adjacent to the opposite ends of said housing, said feet being spaced to be wedged into the space between said bus bar and said flange to frictionally hold said housing in fixed position with respect to said bus bar, and a second contact carried by said circuit breaker and engageable with the first mentioned contact when said circuit breaker is thus buttressed to establish electrical connection between said circuit breaker and said bus bar.

3. The combination of a panelboard mounting and a circuit breaker construction adapted to be received by the panelboard mounting in plug-in fashion, said combination comprising a back plate, a bus bar extending longitudinally of said plate, a flange formed at a side edge of said back plate and disposed in spaced parallel relation to said bus bar, a plurality of blade contacts extending outwardly from said bus bar, said blade contacts being equally spaced longitudinally of said bar and each extending transversely of said bar, a tab turned over at substantially a right angle from the outer edge of said flange toward said bus bar opposite each blade contact, an insulated circuit breaker housing including a pair of feet formed thereon in spaced relationship, said feet being spaced apart to permit them to be engaged respectively against said flange at a tab and wedged against the side of said bus bar opposite that tab, whereby said housing is buttressed between said flange and said bus bar and is thereby held in place with respect to said bus bar, and a second blade contact carried by said circuit breaker, said second blade contact engageable with the first mentioned blade contact which is opposite the engaged tab when said circuit breaker is thus buttressed to establish electrical connection between said circuit breaker and said bus bar.

4. The combination of a panelboard mounting and a circuit breaker construction adapted to be received by the panelboard mounting in plug-in fashion, said combination comprising a back plate, a bus bar disposed longitudinally of said back plate, a plurality of blade contacts extending outwardly from said bus bar, said contacts being equally spaced and disposed transversely of said bus bar, a flange formed at an edge of said back plate, said flange being disposed parallel with said bus bar and in spaced relationship therewith, a circuit breaker having an insulated housing, said housing configured to provide a pair of feet adjacent opposite ends thereof, a tab turned inwardly toward said bus bar from the outer edge of said flange opposite each of said blade contacts, a second blade contact disposed at an end of said circuit breaker above and overhanging one of said feet, a terminal disposed at the opposite end of said circuit breaker above the other of said feet, the foot at the end of said circuit breaker housing having the terminal associated therewith being recessed and adapted to receive a tab, the opposite foot having a wedge shaped outer face, the respective feet being spaced to permit them to be wedged respectively against the flange beneath a tab and against the side of a bus bar at a point opposite a tab, and said second blade contact being constructed and arranged to engage the first mentioned contact when the respective feet are thus wedged.

5. Means for mounting a circuit breaker upon a panelboard comprising a bus bar extending longitudinally of said panelboard, means rigidly securing said bus bar to said panelboard, a blade contact extending outwardly from said bus bar, a buttress member disposed at a side of said bus bar in spaced relationship therewith, a circuit breaker having an insulated housing including a pair of abutment elements disposed at the opposite ends of one side thereof, said abutment elements spaced to be wedged between said bus bar and said buttress member to hold said circuit breaker housing in fixed relationship relative to said bus bar, and a jaw contact carried by said circuit breaker adapted to receive and embrace said blade contact when said circuit breaker is thus wedged.

6. Frictional interlocking means for fastening a circuit breaker to a panelboard mounting, said means comprising a bus bar, means rigidly securing said bus bar to said panelboard mounting, a blade contact extending outwardly from said bus bar, a flange disposed in spaced parallel relation to said bus bar, a tab turned inwardly toward said bus bar from said flange, a circuit breaker having an insulated housing configured to provide a pair of feet, said feet constructed and arranged respectively to engage the flange under said tab and the side of said bus bar adjacent said tab in wedging relationship, and a pair of blade contacts carried by said circuit breaker adapted to engage the respective sides of the first mentioned blade contact when said circuit breaker is thus wedged.

7. An electrical panelboard mounting comprising a back plate, a pair of dielectric terminal blocks rigidly affixed to said back plate in spaced relationship, three bus bars rigidly secured at their respective ends to the respective terminal blocks, said bus bars being disposed in spaced parallel relationship in which their respective axes define a triangular prism having a side parallel with the back plate, a plurality of T-shaped electrical connectors secured to and extending inwardly toward the back plate from the bus bar which has its axis at the outer apex of said triangular prism, and a plurality of L-shaped electrical connectors extending outwardly from the other two bus bars, the respective connectors being equally spaced longitudinally of the mounting.

8. An electrical panelboard mounting comprising a back plate, a pair of dielectric terminal blocks rigidly affixed to said back plate in spaced relationship, three bus bars rigidly secured at their respective ends to the respective terminal blocks, said bus bars being disposed in spaced parallel relationship in which their respective axes define a triangular prism having a side parallel with the back plate, a plurality of T-shaped electrical connectors secured to and extending inwardly toward the back plate from the bus bar which has its axis at the outer apex of said triangular prism, and a plurality of L-shaped electrical connectors extending outwardly from the other two bus bars, the respective horizontally disposed arms of the T-shaped connectors and the L-shaped connectors being of equal size, equally spaced and aligned longitudinally of the mounting.

9. In a panelboard mounting a back plate, a pair of terminal blocks, the respective terminal blocks of the pair mounted at opposite ends of said back plate, a pair of bus bars having their respective ends rigidly supported by the respective terminal blocks, said bus bars being disposed in spaced parallel relationship with one another, a plurality of blade contacts mounted upon each of said bus bars, each blade contact being substantially L-shaped and disposed in a plane at right angles to the bus bar upon which it is mounted, said L-shaped blade contact having one arm extending outwardly from said bus bar upon which it is mounted and having a second arm overhanging the other bus bar, and the respective second arms of the respective contacts being equally spaced, aligned longitudinally of the mounting and of substantially identical size.

10. The combination of a panelboard mounting and a circuit breaker construction adapted to be received by the panelboard mounting in plug-in fashion, said combination comprising a back plate, a pair of terminal blocks, the respective terminal blocks of the pair mounted at opposite ends of said back plate, a pair of bus bars having their respective ends rigidly supported by the respective terminal blocks, said bus bars being disposed in spaced parallel relationship with one another, a plurality of contacts mounted upon each of said bus bars, each contact being substantially L-shaped and having one arm extending outwardly from the bus bar upon which it is mounted and having a second arm overhanging the other bus bar, the respective second arms of the contacts being equally spaced, aligned longitudinally of the mounting and of substantially identical size, a pair of flanges turned outwardly respectively from opposite sides of said panelboard, each flange of the pair being spaced from a side of a bus bar, a plurality of tabs turned inwardly from the outer edges of the respective flanges at points opposite said contacts, and a circuit breaker having an insulated housing, a pair of feet on said housing, said feet being constructed and arranged for wedging engagement respectively with a flange at a tab and with the outer side of a bus bar opposite said tab, whereby the circuit breaker housing is buttressed therebetween, and a contact carried by said circuit breaker engageable with an end of the overhanging arm of the L-shaped contact opposite the engaged tab when said circuit breaker is thus buttressed to establish an electrical connection between said circuit breaker and said contact.

11. Frictional interlocking means for fastening a circuit breaker to a panelboard mounting in plug-in fashion, said means comprising a bus bar, means rigidly securing said bus bar to said panelboard mounting, a blade contact extending outwardly from said bus bar, a flange disposed in spaced parallel relation to said bus bar, a tab turned inwardly toward said bus bar from said flange at a point opposite said blade contact, a circuit breaker having an insulated housing including a pair of feet, one of said feet having a recess arranged to seat said tab, the outer portions of said feet spaced apart to engage respectively the flange under said tab and the side of said bus bar opposite said tab in wedging relationship upon installation of the circuit breaker in a rocking motion in which the recessed foot is first engaged under said tab and the other foot is swung toward said bus bar, and a pair of blade contacts carried by said circuit breaker, said blade contacts positioned to engage the respective sides of the first mentioned blade contact before said other foot engages the bus bar, whereby the circuit breaker is guided by said engagement to the position in which said other foot is in wedged relationship with said bus bar.

12. Means for mounting a circuit breaker upon a panelboard comprising a pair of buttress members disposed in spaced relationship, a circuit breaker having an insulated housing including spaced abutments thereon which are adjacent to the opposite ends of said housing, said abutments engageable respectively with said buttress members in wedged relationship therewith to hold said circuit breaker in fixed position, contact means on said panelboard, and contact means on said circuit breaker independent of said abutments initially engageable with the contact means on said panelboard when said circuit breaker is being moved toward said wedged relationship, the latter named contact means effective to guide and align said circuit breaker during said movement and to establish electrical connection between the respective contacts before the circuit breaker housing is in place to be held in fixed position by the engagement of the abutments with the buttress members.

References Cited in the file of this patent

UNITED STATES PATENTS

| | | |
|---|---|---|
| 2,007,174 | Benjamin | July 9, 1935 |
| 2,632,039 | Hammerly | Mar. 17, 1953 |
| 2,647,225 | Cole | July 28, 1953 |